United States Patent [19]

Matsubara

[11] Patent Number: 5,202,715
[45] Date of Patent: Apr. 13, 1993

[54] PLATE MEMBER FOR USE AS MATERIAL OF LIGHT SHIELDING BLADES

[75] Inventor: Takashi Matsubara, Tokyo, Japan

[73] Assignee: Nikon Corporation, Tokyo, Japan

[21] Appl. No.: 905,137

[22] Filed: Jun. 23, 1992

Related U.S. Application Data

[63] Continuation of Ser. No. 621,887, Dec. 4, 1990, abandoned.

[30] Foreign Application Priority Data

Dec. 7, 1989 [JP] Japan .................................. 1-318244
Sep. 18, 1990 [JP] Japan .................................. 2-247917

[51] Int. Cl.⁵ .............................................. G03B 9/40
[52] U.S. Cl. .............................................. 354/246
[58] Field of Search ..................... 354/226, 245–250; 359/227, 233, 234, 235, 236; 428/113, 288, 408

[56] References Cited

U.S. PATENT DOCUMENTS 4,482,231 11/1984 Kato et al. ........................... 354/246
5,025,278 6/1991 Matsubara ........................... 354/246

FOREIGN PATENT DOCUMENTS 0394996 10/1990 European Pat. Off. .
8633679 2/1987 Fed. Rep. of Germany .
3919770 12/1989 Fed. Rep. of Germany .
59-61827 4/1984 Japan .
62-199439 9/1987 Japan .
63-17435 1/1988 Japan .

*Primary Examiner*—Michael L. Gellner
*Assistant Examiner*—Howard B. Blankenship
*Attorney, Agent, or Firm*—Shapiro and Shapiro

[57] ABSTRACT

A laminated plate member having a thickness of 60 to 120 μm and used as a material of focal plane shutter blades or iris blades of a camera has an intermediate layer made from a material composed of uni-directionally oriented continuous (long) or short carbon fibers and a matrix resin enveloping the carbon fibers, the material having a resin content ranging from 50 to 60 wt % when the carbon fibers are long fibers and 60 to 75 wt % when the fibers are short fibers, and surface layers on both sides of the intermediate layer, each surface layer being made from a material composed of a matrix resin enveloping long carbon fibers uni-directionally oriented in a direction substantially orthogonal to that of the carbon fibers in the intermediate layer, the material of the surface layers having a resin content ranging from 30 to 45 wt %.

16 Claims, 2 Drawing Sheets

PLATE MEMBER FOR USE AS MATERIAL OF LIGHT SHIELDING BLADES

This is a continuation of application Ser. No. 621,887 filed Dec. 4, 1990, now abandoned.

BACKGROUND OF THE INVENTION

1. Field of the Invention

The present invention relates to a plate member for use as a material of light shielding blade members which are required to move at a high velocity, such as focal plane shutter blades or lens shutter blades of a camera.

2. Related Background Art

In general, it is desirable to operate a light-shielding blade at a high velocity with a small force, and with minimal flexing of the blade. This requires a light-shielding blade that is lightweight and that possesses high strength and rigidity.

To meet the foregoing requirement, a plate member for use as a material of light-shielding blades has been proposed which has a laminate construction including a reinforced-resin intermediate layer composed of a resin matrix with uni-directionally oriented continuous (long) carbon fibers, and reinforced-resin surface layers composed of a resin matrix with continuous carbon fibers uni-directionally oriented in a direction substantially orthogonal to the direction of the fibers in the intermediate layer, the light-shielding member having a total thickness of 60 to 120$\mu$. This type of plate member is disclosed, for example, in Japanese Patent Application Laid-Open No. 59-61827 U.S. Pat. No. 4,482,231, Japanese Patent Application Laid-Open No. 62-199439 and Japanese Patent Application Laid-Open No. 63-17435.

Obviously, the layers forming this plate member are arranged in plane-symmetry in the thickness direction. In addition, each of the intermediate and surface layers may be a laminate layer composed of a plurality of thin reinforced resin sheets. In general, 20 to 50 blades are formed by cutting or punching from this plate member, such that, in each blade the longitudinal direction of the carbon fibers of the intermediate layer is substantially orthogonal to the longitudinal axis of the blade. The light-shielding blades thus formed are lightweight and superior in hardness and rigidity, and are actually used in cameras having a high shutter release speed of 1/8000 second.

The light-shielding blade thus formed suffers from disadvantages due to its small thickness which usually ranges between 60 and 120$\mu$. The first problem is that the plate member as the blank of the light-shielding blade generally exhibits a large thickness variation. The second problem is that the plate member is inferior in flatness, i.e., that the plate member is warped or distorted. The third problem is that the light-shielding blade formed by punching or cutting also is inferior in flatness.

FIG. 1 is an illustration of a vertical-running type focal plane shutter in assembled state, wherein the light-shielding blades formed by the above-described process are used as a first blade 31, a second blade 39, a third blade 40, a fourth blade 41 and a fifth blade 42.

Arms 34 and 35 are rotatably connected to pins 32, 33 provided on the first blade 31. The arms 34, 35 are rotatable about shafts 37, 38 provided on a shutter base plate 36. The pins 32, 33 and the shafts 37, 38 are arranged in a parallelepiped quadrilateral form, so that the first blade 31 translationally moves in the vertical direction of the aperture 46 in accordance with rotation of the arms 32, 33. However, the second blade 39, the third blade 40, the fourth blade 41 and the fifth blade 42 are moved in a manner different from that of movement of the first blade 31. More specifically, a pin 43 provided on the first blade 31 is rotatably connected to the second blade 39, while a pin 45 provided on an arm 44 rotatably supported by a shaft 37 engages with a cam groove 39a formed in the base portion of the second blade 39. Consequently, the motion of the second blade 39 is determined by the movement of the pin 45 and the contour of the cam groove 39a, through the action of the pin 43. The third blade 40 is rotatably carried by the shaft 38 and a cam groove 40a engaging with the pin 45 is provided on the base portion thereof. The fourth and fifth blades 41 and 42 are also rotatably carried by the shaft 38 and are provided with cam grooves 41a and 42a for engagement with the pin 45. The pin 45 also is rotatably connected to arm 34 which is rotatably supported by the shaft 37, so as to rotate together with the arm 44 which rotates about the shaft 37. The cam grooves 39a, 40a, 41a, and 42a are arranged such that the blades are developed to cover the aperture 46 when the first blade 31 is positioned above the aperture 46 as viewed in the Figure, whereas, when the first blade 31 is retracted to the underside of the aperture 46, all the blades are superposed. In this arrangement, the third to fifth blades 40 to 42 rotate about the center of the shaft 38 as if forming a fan or a sector. In general, a focal plane shutter device of the kind described includes a pair of the described group of blades. One of the blade groups serves as shutter opening blades, while the other serves as shutter closing blades.

The focal plane shutter device of the kind described, employing blades made from the conventional plate member, tends to suffer from problems in regard to connection between the driving system and the blades due to inferior flatness of the plate member and due to local reductions in strength caused by presence of micro-cracks and cavities in the plate material. In addition, the appearance of the blades and applicability of DL (dry lubricant) are also impaired.

SUMMARY OF THE INVENTION

Accordingly, an object of the present invention is to overcome the above-described problems of the prior art.

The present inventor conducted extensive research to determine the causes of these problems. As a result of this effort, it was discovered that with the conventional plate member, in which both the intermediate and surface layers have resin contents as small as 30 to 45 wt %, the small resin content in the intermediate layer leads to the creation of defects, such as micro-cracks and cavities, as well as to inferior flatness.

As a result of a further study, the present inventors have found that the above-described problems of the prior art can be overcome by increasing the resin content of the intermediate layer to 50 to 60 wt % when the resin is used in combination with continuous (long) fibers and to 60 to 75 wt % when used together with short fibers, without increasing the resin content of the surface layers. Thus, the inventors have found also that the desired light-shielding blades can be obtained even if short fibers are used in place of conventional continuous or long fibers in the intermediate layer, provided that the short fibers are uni-directionally oriented.

According to the present invention, there is provided a laminated plate member having a thickness of 60 to 120μ for use as a material of light-shielding blades, comprising: an intermediate layer having at least one layer made from sheet material with uni-directionally oriented continuous or short carbon fibers enveloped in matrix resin and with resin content ranging from 50 to 60 wt % when said carbon fibers are continuous fibers and 60 to 75 wt % when said fibers are short fibers; and surface layers on both sides of the intermediate layer, each surface layer having at least one layer made from sheet material with continuous carbon fibers enveloped in matrix resin and uni-directionally oriented in a direction substantially orthogonal to that of the carbon fibers in said one layer of the intermediate layer and with resin; content ranging from 30 to 45 wt %.

The reinforced resin from which the intermediate and surface layers are formed is composed of uni-directionally oriented continuous carbon fibers and matrix resin enveloping such fibers. The fiber, however, may be short fibers in the case of the intermediate layer. Preferably, a prepreg sheet formed by impregnating carbon fibers with a precursor of the matrix resin is used as the green material.

The prepreg sheet is formed by impregnating reinforcement fibers with a thermosetting resin liquid, e.g., uncured liquid of an epoxy resin or unsaturated polyester, which is a precursor of the matrix resin, and transforming the resin liquid to B stage in which the resin has been cured to eliminate fluidity but is still curable finally by application of heat.

The plate member of the present invention can be formed by preparing a plurality of prepreg sheets each being about 10 to 60μ thick, sandwiching at least one prepreg sheet as an intermediate layer between at least two prepreg sheets as the surface layers, such that the the longitudinal axes of the surface fibers in the sheet of the intermediate layer and those of the carbon fibers in the two sheets of the surface layers are substantially orthogonal to each other, and such that these layers are arranged in a plane-symmetry in the thicknesswise direction, and applying heat and pressure to the sandwich structure so as to cure the resin.

The intermediate layer and each of the surface layers may be formed from a plurality of prepreg sheets stacked and laminated with their carbon fibers oriented in the same direction or substantially at right angles. For instance, the plate member may have one upper surface layer made from a single prepreg sheet, an intermediate layer composed of two prepreg sheets superposed one on the other with their carbon fibers oriented in the same direction, and one lower surface layer composed of a single prepreg sheet, the upper and lower surface layers having their carbon fibers oriented in the direction orthogonal to the carbon fibers of the prepreg sheets forming the intermediate layer.

The carbon fibers used in the intermediate layer may be short carbon fibers with lengths preferably ranging between 1 and 30 mm and more preferably between 5 and 15 mm.

Both the continuous (long) and short carbon fibers preferably have diameters of 3 to 10μ.

In order to obtain sufficiently high light-shielding effect and surface lubricating power, carbon black may be added to the prepreg composition as desired, at a ratio of 5 to 15 wt % to the resin liquid (solid content 100 wt parts). Preferably, the carbon black has a mean particle size of 0.07μ or less. The addition of the carbon black may be made only to the prepreg sheets of the surface layers or only to the prepreg sheet or sheets of the intermediate layer. Different characteristics are obtainable by selective addition of the carbon black to the prepreg layers.

The plate material of the invention can be obtained by subjecting the laminate of the prepreg sheets to heat-pressing. A black coating (dry lubricant application) may be effected in this step for the purposes such as improvement in the light-shielding effect, reduction in the surface reflectivity, improvement in the appearance and improvement in the surface lubricating property. The thickness of the coating film is preferably 0.1 to 10μ. In order to eliminate any risk of warping or distortion of the plate member, the thickness of the coating layer is preferably selected to range between 0.1 to 3 μm.

By cutting or punching the thus obtained plate member into light-shielding blades of a predetermined configuration, it is possible to produce 20 to 50 light-shielding blades at a time. The cutting or punching is conducted such that the carbon fibers in at least one sheet used in the intermediate layer are oriented orthogonally to the longitudinal axis of the blade, i.e., such that the longitudinal axes of these fibers are substantially orthogonal to the longitudinal axis of the blade. The black coating may be applied to each piece of the light-shielding blade at this point, rather than during the heat-pressing stage as noted above.

DESCRIPTION OF THE PREFERRED EMBODIMENTS

The invention will be fully described hereinafter with respect to its preferred embodiments. It is to be understood, however, that the described embodiments are only illustrative and do not limit the scope of the invention, which is defined in the appended claims.

Figure 1:
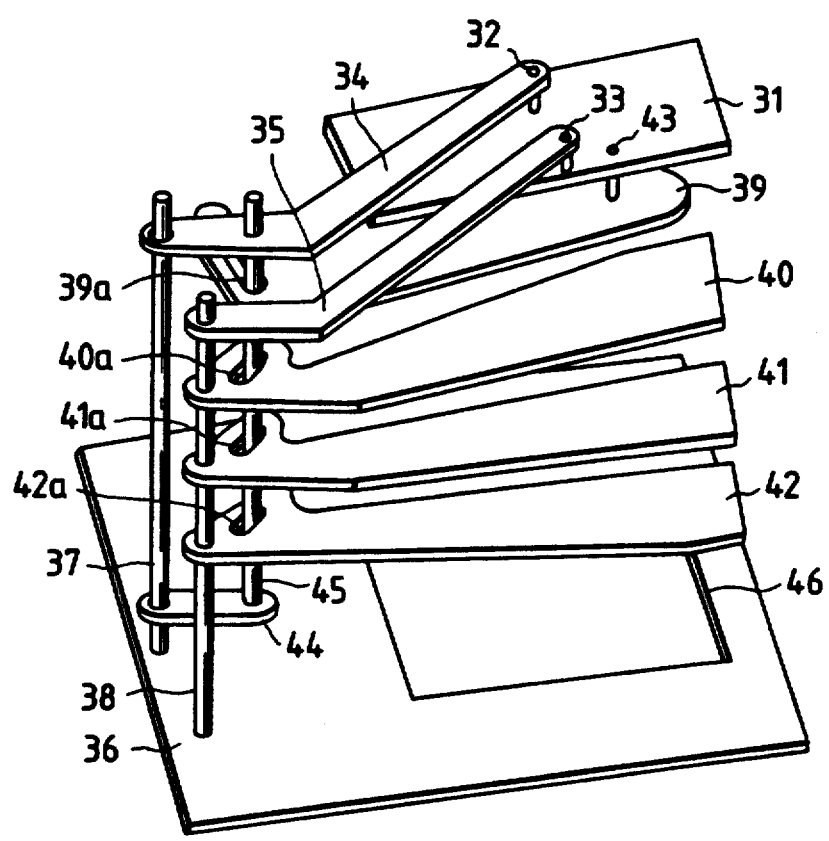
FIG. 1 is an illustration of a vertical-running type focal plane shutter in assembled state.
Figure 2:
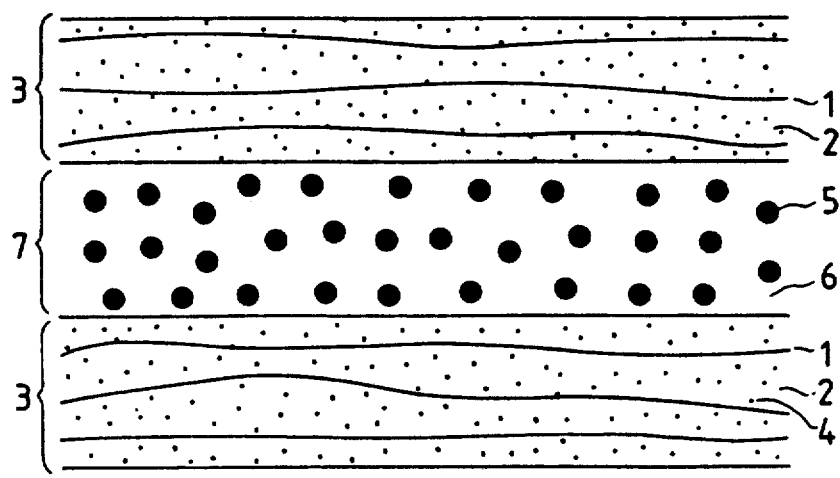
FIG. 2 is a schematic vertical sectional view of Example 2 of a plate member for the invention for use as a material of light-shielding blades.
Figure 3:
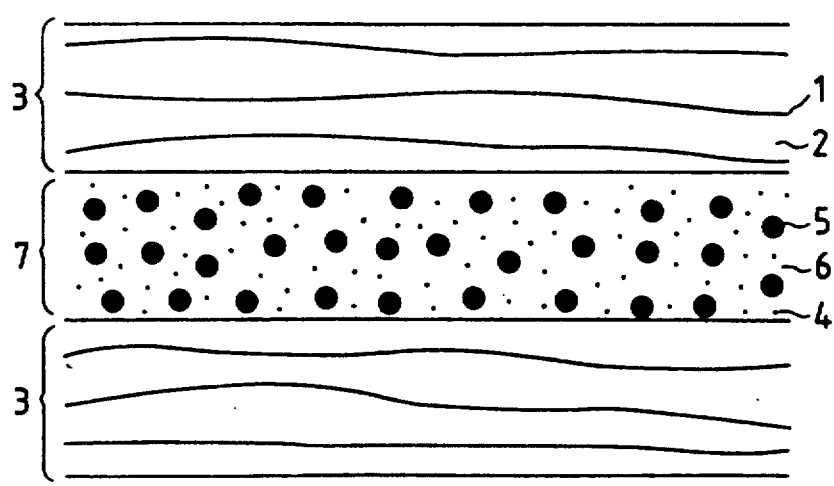
FIG. 3 is a schematic vertical sectional view of Example 3 of a plate member of the invention for use as a material of light-shielding blades.

Referring to FIGS. 2 and 3, numeral 1 denotes continuous (long) carbon fibers, 2 denotes a matrix resin, 3 denotes surface layers, 4 denotes carbon black, 5 denotes short carbon fibers, 6 denotes a matrix resin and 7 denotes an intermediate layer.

EXAMPLE 1

(1) Prepreg sheets A of 20 to 40μ thick were prepared by enveloping, in an epoxy resin as a matrix resin, uni-directionally oriented continuous carbon fibers of 6 to 7μ in diameter. The resin content of the prepreg sheet A was 35 to 45 wt %.

(2) Prepreg sheets B of 10 to 50μ thick were prepared by enveloping, in an epoxy resin as a matrix resin, uni-directionally oriented short carbon fibers of 6 to 7μ in diameter and 1 to 30 mm in length. The resin content of the prepreg sheet B was 60 to 75 wt %. This sheet B could be produced by centrifugal lifting method which makes use of a paper making process.

(3) A multiplicity of plate members of 60 to 120μ thick were produced by using the prepreg sheets. More specifically, each plate member was formed by interposing one prepreg sheet B forming an intermediate layer between a pair of prepreg sheets A forming surface layers, in a plane-symmetrical form such that the direction of the longitudinal axes of the sheet B was orthogonal to the direction of the longitudinal axes of the carbon fibers in the sheets A. Thus, the directions of the longitudinal axes of the carbon fibers of both sheets A were the same. The thus formed sandwich structure was then subjected to a pressure of 5 to 15 kg/cm$^2$ at 130° C. and was left for 1 to 2 hours so that the epoxy resin was cured. Subsequently, the structure was gradually cooled down to room temperature, whereby the plate member was formed.

The plate members thus formed were examined for any thickness variation and warp, and the ratio of the number of the plate members having acceptable levels of flatness to the total number of the plate members was determined. This ratio will be referred to as "first yield", hereinafter.

(4) 20 to 50 light-shielding blades for a focal plane shutter device were produced by press punching from one of the plate members having acceptable levels of flatness. The punching was conducted such that the direction of the longitudinal axes of the carbon fibers of the intermediate layer were orthogonal to the longitudinal axis of the light-shielding blade.

The thus obtained light-shielding blades were examined for thickness variation and warp, and the ratio of the number of the light-shielding blades having acceptable levels of flatness, to the total number of the blades was determined. This ratio will be referred to as "second yield".

(5) Black coating film with dry lubricant, 4μ in thickness, was formed on each side of each of the light-shielding blades having acceptable levels of flatness. Formation of the black coating film on the blade member often causes internal strain to be developed so as to warp the blade. Therefore, the light-shielding blades with black coating film were examined for any warp and the ratio of the number of the light-shielding blades with acceptable levels of flatness to the total number of the blades with black coating film was determined. This ratio will be referred to as "third yield", hereinafter. The first to third yields thus determined are shown in Table 1.

COMPARISON EXAMPLE 1

Three prepreg sheets A used in Example 1 were superposed such that the direction of the longitudinal axes of the carbon fibers in the intermediate sheet was orthogonal to the directions of longitudinal axes of the carbon fibers of the two outer sheets A. Using this structure, plate members, light-shielding blades and black-coated light-shielding blades were produced in the same manner as Example 1, and the first to third yields of were determined by the same procedure as Example 1. The results are shown in Table 1.

TABLE 1

|  | Example 1 | Comparison Example 1 |
| --- | --- | --- |
| First yield (%) | Approx. 100% | Approx. 90% |
| Second yield (%) | Approx. 80 to 100% | Approx. 50 to 70% |
| Third yield (%) | Approx. 90% | Approx. 90% |
| Total | Approx. 72 to 90% | Approx. 41 to 57% |

EXAMPLE 2

Prepreg sheets A' were prepared to have the same construction as the prepreg sheets A used in Example 1 except that 10 wt % of carbon black, having a mean particle size of 0.01μ or less, was added per 100 weight parts. Using these prepreg sheets A', plate members, light-shielding blades and black-coated light-shielding blades were produced in the same manner as Example 1.

EXAMPLE 3

Prepreg sheets B' were prepared to have the same construction as the prepreg sheets B used in Example 1 except that 10 wt % of carbon black, having a mean particle size of 0.01μ or less, was added per 100 weight parts. Using these prepreg sheets B', plate members, light-shielding blades and black-coated light-shielding blades were produced in the same manner as Example 1.

EXAMPLE 4

Plate members were produced by sandwiching two prepreg sheets B of Example 1 between a pair of prepreg sheets A of Example 2, such that the direction of the longitudinal axes of the carbon fibers in the intermediate sheets B was orthogonal to the direction of the longitudinal axes of the carbon fibers in the outer surface sheets A'. Thus, the sandwich structure was formed by four sheets arranged in plane-symmetry in the thickness direction, so that the resulting plate member has an intermediate layer composed of a pair of sheets B. Using the thus obtained plate members, light-shielding blades and black-coated light-shielding blades were produced in the same manner as Example 1.

EXAMPLE 5

Prepreg sheets B" of 10 to 50μ thick were prepared by enveloping uni-directionally oriented continuous carbon fibers of a mean diameter of 6 to 7μ in an epoxy resin as a matrix resin. The resin content was 50 to 60 wt %. Plate members, light-shielding blades and black-coated light-shielding blades were produced in the same manner as Example 1 except that the prepreg sheets B" were used in place of the prepreg sheets B.

The black-coated light-shielding blades of Examples 1 to 5 were subjected to a durability test in high-speed camera shutters. The high-speed shutters produced from these black-coated light-shielding blades could withstand more than 400,000 shutter releasing cycles, thus proving satisfactory high-speed stability and high-speed running characteristics.

The intermediate layer can be formed of three or more prepreg sheets B. In such a case, it is not always necessary that all these prepreg sheets constituting the intermediate layer have an equal resin content, although it is essential that these three or more prepreg sheets are arranged in plane-symmetry. When a plurality of prepreg sheets are used to form the intermediate layer, these prepreg sheets maybe assembled such that the directions of orientation of carbon fibers in these sheets are orthogonal to each other.

As has been described, according to the present invention, it is possible to obtain a plate member for use as a material of light-shielding blades with a high level of flatness at a high yield, i.e., with high values of the aforesaid first to third yields. Consequently, the cost of production of light-shielding blades can be reduced remarkably despite the use of prepreg sheets which are generally expensive due to use of carbon fibers.

In addition, since a high level of flatness is obtainable in conjunction with reduced thickness of the plate member, the weight of the light-shielding blade is reduced, which significantly contributes toward realization of super-high-speed shutter blades which operate at a very high speed of 1/12000 second or higher.

What is claimed is:

1. A light-shielding blade having a thickness of 60 to 120 μm and comprising a laminate of at least three blade-layers of carbon fiber reinforced resin sheet material, including:
    an intermediate blade-layer having at least one layer made from sheet material with uni-directionally oriented long carbon fibers enveloped in matrix resin and with resin content ranging from 50 to 60 wt %; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer and with resin content ranging from 30 to 45 wt %.

2. A shutter blade having a thickness of 60 to 120 μm and comprising a laminate of at least three blade-layers of carbon fiber reinforced resin sheet material, including:
    an intermediate blade-layer having at least one layer made from sheet material with uni-directionally oriented long carbon fibers enveloped in matrix resin and with resin content ranging from 50 to 60 wt %; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer and with resin content ranging from 30 to 45 wt %.

3. A light-shielding blade having a thickness of 60 to 120 μm and comprising a laminate of at least three blade-layers of carbon fiber reinforced resin sheet material, including:
    an intermediate blade-layer having at least one layer made from sheet material with uni-directionally oriented short carbon fibers enveloped in matrix resin and with resin content ranging from 60 to 75 wt %; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer and with resin content ranging from 30 to 45 wt %.

4. A shutter blade having a thickness of 60 to 120 μm and comprising a laminate of at least three blade-layers of carbon fiber reinforced resin sheet material, including:
    an intermediate blade-layer having at least one layer made from sheet material with uni-directionally oriented short carbon fibers enveloped in matrix resin and with resin content ranging from 60 to 75 wt %; and
    surface blade-layers on both sides of said intermediate blade-layer, each said surface blade-layer including at least one layer made from sheet material with long carbon fibers enveloped in matrix resin and uni-directionally oriented in a direction substantially orthogonal to that of said carbon fibers in said one layer of said intermediate blade-layer and with resin content ranging from 30 to 45 wt %.

5. A light-shielding blade comprising a laminate of at least three blade-layers of carbon fiber reinforced resin sheet material, including:
    an intermediate blade-layer having at least one layer made from sheet material with uni-directionally oriented long carbon fibers enveloped in matrix resin; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer; and
    wherein the sheet material of said one layer of said intermediate blade-layer has a higher resin content than the sheet material of the respective said one layer of each said surface blade-layer.

6. A light-shielding blade according to claim 5, wherein the sheet material of the respective said one layer of each said surface blade-layer has a resin content of 30 to 45 wt %.

7. A shutter blade comprising a laminate of at least three blade-layers of carbon fiber reinforced resin sheet material, including:
    an intermediate blade-layer having at least one layer made from sheet material with uni-directionally oriented long carbon fibers enveloped in matrix resin; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer; and
    wherein the sheet material of said one layer of said intermediate blade-layer has a higher resin content than the sheet material of the respective said one layer of each said surface blade-layer.

8. A shutter blade according to claim 7, wherein the sheet material of the respective said one layer of each said surface blade-layer has a resin content of 30 to 45 wt %.

9. A light-shielding blade comprising a laminate of at least three blade-layers of carbon fiber reinforced resin sheet material, including:
    an intermediate blade-layer having at least one layer made from sheet material with uni-directionally oriented short carbon fibers enveloped in matrix resin; and
    surface blade-layers on both sides of said intermediate blade-layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer; and
    wherein the sheet material of said one layer of said intermediate blade-layer has a higher resin content than the sheet material of the respective said one layer of each said surface blade-layer.

10. A light-shielding blade according to claim 9, wherein the sheet material of the respective said one layer of each said surface blade-layer has a resin content of 30 to 45 wt %.

11. A shutter blade comprising a laminate of at least three blade-layers of carbon fiber reinforced resin sheet material, including:
   an intermediate blade-layer having at least one layer made from sheet material with uni-directionally oriented short carbon fibers enveloped in matrix resin; and
   surface blade-layers on both sides of said intermediate blade layer, each said surface blade-layer having at least one layer made from sheet material with long carbon fibers enveloped in matrix resin and uni-directionally oriented in a direction substantially orthogonal to that of said carbon fibers in said one layer of said intermediate blade-layer; and
   wherein the sheet material of said one layer of said intermediate blade-layer has a higher resin content than the sheet material of the respective said one layer of each said surface blade-layer.

12. A shutter blade according to claim 11, wherein the sheet material of the respective said one layer of each said surface blade-layer has a resin content of 30 to 45 wt %.

13. A light-shielding blade comprising a laminate of at least three blade-layers of carbon fiber reinforced resin sheet material, including:
   an intermediate blade-layer having at least one layer made from sheet material with short carbon fibers enveloped in matrix resin; and
   surface blade-layers on both sides of said intermediate blade-layer, each said surface blade-layer having at least one layer made from sheet material with long carbon fibers enveloped in matrix resin and uni-directionally oriented.

14. A light-shielding blade according to claim 13, wherein the short carbon fibers of said one layer of said intermediate blade-layer are uni-directionally oriented in a first direction, and the long carbon fibers of said one layer of each surface blade-layer are uni-directionally oriented in a second direction substantially orthogonal to said first direction.

15. A shutter blade comprising a laminate of at least three blade-layers of carbon fiber reinforced resin sheet material, including:
   an intermediate blade-layer having at least one layer made from sheet material with short carbon fibers enveloped in matrix resin; and
   surface blade-layers on both sides of said intermediate blade-layer, each said surface blade-layer including at least one layer made from sheet material with long carbon fibers enveloped in matrix resin and uni-directionally oriented.

16. A shutter blade according to claim 15, wherein the short carbon fibers of said one layer of said intermediate blade-layer are uni-directionally oriented in a first direction, and the long carbon fibers of said one layer of each surface blade-layer are uni-directionally oriented in a second direction substantially orthogonal to said first direction.

* * * * *